United States Patent
Gumpinger

(10) Patent No.: US 7,039,510 B2
(45) Date of Patent: May 2, 2006

(54) METHOD OF TRANSMITTING VEHICLE DATA

(75) Inventor: Franz Gumpinger, Munich (DE)

(73) Assignee: Bayerische Motoren Werke Atkiengesellschaft, Munich (DE)

( * ) Notice: Subject to any disclaimer, the term of this patent is extended or adjusted under 35 U.S.C. 154(b) by 0 days.

(21) Appl. No.: 10/988,846

(22) Filed: Nov. 16, 2004

(65) Prior Publication Data

US 2005/0137796 A1  Jun. 23, 2005

Related U.S. Application Data

(63) Continuation of application No. PCT/EP03/04123, filed on Apr. 22, 2003.

(30) Foreign Application Priority Data

May 17, 2002  (DE) .............................. 102 22 141

(51) Int. Cl.
G06F 7/00 (2006.01)
(52) U.S. Cl. .................. 701/35; 702/182; 702/184
(58) Field of Classification Search .............. 701/35, 701/36, 32, 29; 340/425.5; 714/25, 31; 702/182–184, 187–188
See application file for complete search history.

(56) References Cited

U.S. PATENT DOCUMENTS 6,006,148 A   12/1999  Strong
6,028,537 A * 2/2000  Suman et al. .............. 340/988

FOREIGN PATENT DOCUMENTS

| | | |
|---|---|---|
| DE | 36 35 667 A1 | 5/1988 |
| DE | 37 28 008 A1 | 3/1989 |
| DE | 195 43 784 A1 | 5/1997 |
| DE | 196 08 232 A1 | 9/1997 |
| DE | 697 01 747 T2 | 9/1997 |
| DE | 197 00 353 A1 | 7/1998 |
| DE | 197 10 393 A1 | 9/1998 |
| DE | 197 40 525 C1 | 2/1999 |
| DE | 198 32 498 A1 | 2/2000 |
| DE | 199 19 501 A1 | 6/2000 |
| DE | 198 38 329 A1 | 9/2000 |
| DE | 199 23 060 A1 | 11/2000 |
| DE | 199 48 663 A1 | 5/2001 |
| DE | 100 21 733 A1 | 11/2001 |
| DE | 100 29 401 A1 | 12/2001 |
| EP | 0 378 945 A1 | 12/1989 |
| EP | 1 069 542 A2 | 7/2000 |
| EP | 1 229 475 A2 | 1/2002 |
| EP | 1 229 475 A3 | 1/2002 |

\* cited by examiner

Primary Examiner—Yonel Beaulieu
(74) Attorney, Agent, or Firm—Crowell & Moring LLP

(57) ABSTRACT

The invention relates to a method for wirelessly transmitting vehicle data, whereby vehicle data provided for data exportation is stored in a storage medium, and is read out and transmitted within the framework of a vehicle data acquisition. At the beginning of the journey, the vehicle data provided for the data exportation is stored in the storage medium or is made available for subsequent readout. At the end of the journey, changes and/or additions are carried out on the data stored in the memory and/or made available at the beginning of the journey.

22 Claims, 2 Drawing Sheets

METHOD OF TRANSMITTING VEHICLE DATA

CROSS-REFERENCE TO RELATED APPLICATIONS

This application is a continuation of PCT Application No. PCT/EP03/04123 filed on Apr. 22, 2003, which claims priority to German Application No. 102 22 141.3 filed May 17, 2002.

BACKGROUND OF THE INVENTION

The invention relates to a method for wirelessly transmitting vehicle data, whereby vehicle data provided for data exportation is stored in a storage medium, and is read out and transmitted within the framework of a vehicle data acquisition, for example, a vehicle diagnosis.

Such a method using a vehicle key, a chip card, or a transponder with an integrated memory is known from German Patent document DE 199 48 663 A1. This memory is used as an intermediate memory for the vehicle data, before the data is transmitted by way of electrical contacts or radio frequencies.

From German Patent document DE 196 50 047 A1, it is known to transmit the vehicle data by way of a communication connection, such as a car telephone, automatically or upon the driver's command to the service station. After the data for the vehicle identification (type, model year, vehicle identification number, holder), also made available are the content of fault memories, control units, etc. The service station can then estimate the extent of the work and suggest a servicing date so that the driver's visit to the service station will be shortened.

German Patent document DE 195 45 888 A1 also relates to a wireless diagnostic data transmission, in which the consideration is also discussed to query the diagnostic data when the vehicle drives into the service area. The use of a key is suggested, which contains a stored vehicle identification in order to release the diagnostic data from the vehicle.

It was found to be a disadvantage, in practice, that an intermediate memory, for example, in the case of a key, includes only limited storage space, so that it is not possible to transmit fault memory and test data to the service station in this manner. An enlargement of the key memory results in additional hardware and software expenditures. In addition, the memory read-in time is longer. The fast withdrawal of the key by the driver at the end of a drive may also lead to problems.

SUMMARY OF THE INVENTION

It is an object of the invention to provide a method for wireless vehicle data transmission, by which no time problem occurs when vehicle data are read into the memory at the end of a drive, and which method can be implemented in a cost-effective manner.

According to the present invention, this object is achieved by providing a method for wirelessly transmitting vehicle data, whereby vehicle data provided for data exportation is stored in a storage medium, and is read-out and transmitted within the framework of a vehicle data acquisition, for example, a vehicle diagnosis. At the beginning of a drive, the vehicle data intended for data exportation is stored in the storage medium, or is made available for a subsequent read-out. At the end of the drive, changes and/or amendments are carried out on the data stored in the memory and/or made available at the beginning of the drive. Advantageous further developments are described and claimed herein.

A preferred characteristic of the method according to the present invention is the storage of the main portion of the data at the beginning or start of the drive. Expediently, the data intended for data exportation is stored, for example, in the central data memory and/or in the corresponding storage medium (such as a memory card, key memory, etc.). The transmission time required for updating the additional data at the conclusion or end of the drive is shortened by the already implemented storage of the already existing data. For example, only the number of kilometers traveled, i.e., the mileage, new fault storage data, new check control data, and/or vehicle condition data, are newly stored.

If data still intended for further transmission is stored in the main memory, that is, the onboard memory, but, for reasons of space, not in the storage medium used as the intermediate memory, corresponding information can be stored in the latter so that the remaining data can still be retrieved at the desired point-in-time.

The manufacturing costs of the vehicle components that are used, such as the memory in the key, are low in this case. Only a suitable interface, such as the Bluetooth interface, has to be provided by which the data written in the main memory can be retrieved. In this manner, information concerning the stored fault behavior of vehicle components and assemblies, or additional vehicle condition data, can be transmitted, whereby the service advisor receives data as a basis for a shop order. By means of the data, the service advisor can ask the driver about the faults which have occurred and thus prepare the shop order in a significantly more competent manner. The service advisor and the mechanic in the shop are, therefore, assisted in their work. As a result of the qualified order containing vehicle data, a short diagnostic test can, in most cases, be eliminated.

If a radio transmitter is used for performing the data transmission from the vehicle, the storage problem will be reduced. For example, a car telephone (which is installed anyhow) or a correspondingly connected mobile telephone or mobile device can be used. If new fault memory, check control or important vehicle condition data occur during the vehicle drive, such data are sent, for example, by SMS, to a provider or, for example, to a central dealer computer and are stored by means of the vehicle identification number. Depending on the identification, the data can be stored and/or can immediately be transmitted to a desired addressee (dealer/service station/call center, etc.) in order to prepare an appointment. If the driver visits a service station or otherwise plans accordingly, the service station can retrieve the data, for example, from the provider databank.

In this case, it can be provided that possibly not all data intended for transmission is sent from the onboard memory. Rather, the sent data would then contain information that other retrievable transmission data exists.

After only the vehicle identification number has been stored and otherwise only fault data are transmitted, it becomes possible to continuously monitor the vehicle and to maintain the data in a correspondingly updated manner, without any problems concerning data protection. The data stored in the provider databank are preferably deleted, for example, after the query, so that the occurring storage costs are relatively low.

The vehicle data can also be sent upon the driver's command or by request of the service station when driving into the service yard, and can be stored in the central memory of the service station. If this happens too fast or is not completed, or if additional data have arrived since the last data transmission, then, for example, the onboard power supply can be kept in an active state for another hour in order to retrieve the remaining data not yet transmitted from the onboard memory from the service advisor's work site.

It can also be provided that stored vehicle data or partial data are transmitted from the key or the central data memory to the shop. For example, only the vehicle identification number could be transmitted. If authorized, the dealer or the service station will then retrieve the remaining vehicle data from the central data memory or the dealer databank. The vehicle data will then be available to the service advisor when the driver arrives there.

The method according to the present invention permits the categorizing and transmitting of defects and abnormalities that occurred according to defined criteria, for example, according to their importance (safety-related defects, short-term faults, only comfort-related faults). Wear data can also be detected and transmitted in order to improve the assessment of the vehicle condition and take possible preventative measures; for example, carrying out a parts exchange before a defect occurs. Also, after evaluating the transmitted data in a central office, such as the service station, a data packet with a defect elimination program can be transmitted to the vehicle, for eliminating defects. Such a program can contribute to postponing an otherwise required shop visit to a later point in time or even to making such a visit unnecessary.

In addition, maintenance and repair data of a vehicle can be stored in a central databank (such as a provider databank, a dealer computer or the like), to which any shop has access, instead of looking into a service record booklet. If the vehicle owner has personal access by Internet to the above-mentioned central computer (portal), he can also directly access his vehicle maintenance data. A service record booklet can, therefore, be eliminated because all information (dealer, mileage, data, extent of servicing) is available.

Another use of the method according to the invention consists of a vehicle query from a central office, such as the manufacturer. The manufacturer can, for example, query vehicle condition data while observing the data protection rules for the purpose of quality control. In this manner, for example, software updates can also be imported into the onboard computer of the vehicle.

Other objects, advantages and novel features of the present invention will become apparent from the following detailed description of the invention when considered in conjunction with the accompanying drawings.

DETAILED DESCRIPTION OF THE DRAWINGS

Figure 1:
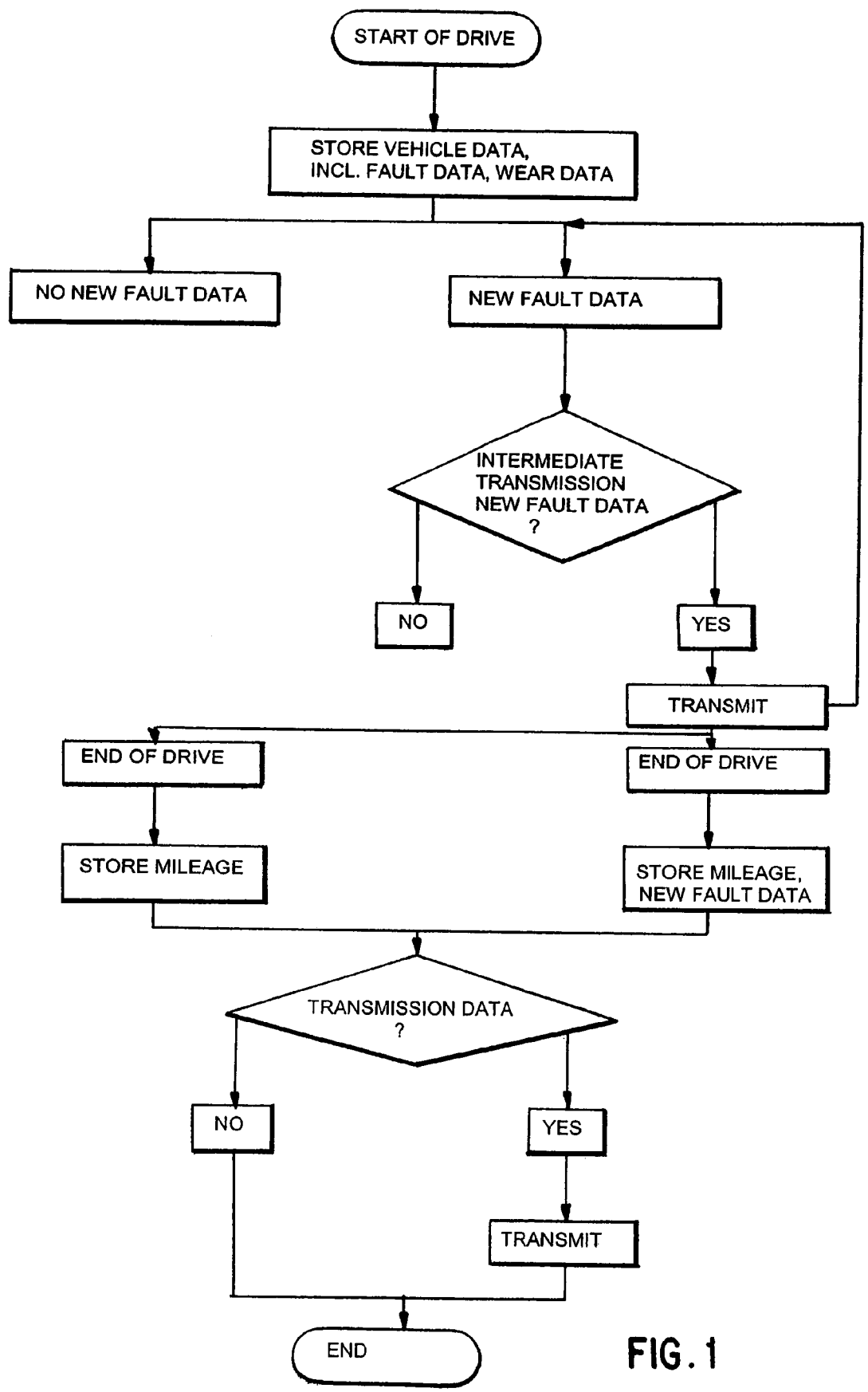
FIG. 1 is a flow chart illustrating the sequence of a first embodiment of the method according to the present invention.

The vehicle used in the exemplary embodiment of the method according to the invention illustrated in FIG. 1 is equipped with a central data memory for the vehicle data acquisition or detection, for example, a vehicle diagnosis. It also has a built-in car telephone, and the vehicle key is equipped with a transponder including a memory.

At the start of the drive, the vehicle data is written into the memory of the vehicle key. The vehicle data is essentially the vehicle identification number, the mileage, the defect storage data and vehicle condition data and the check control data. If no faults or other special events occur during the drive, at the end of the drive, only the mileage will be updated in the vehicle key memory.

If an abnormality or a defect occurs during the drive, the corresponding data is stored in fault files in the central data memory. Optionally, an intermediate storage of the changed data takes place in the memory of the key. This is repeated depending on whether or not additional faults or abnormalities occur. At the end of the drive, in addition to the mileage, the fault files in the vehicle key memory are updated, if this has not taken place during the drive.

It can also be provided that the vehicle data, including the fault data, with the occurrence of defects or abnormalities, is virtually transmitted immediately or at the end of the drive. The car telephone is used for this purpose. The command can take place by way of a previous data input, so that a transmitting operation is automatically triggered, for example, by way of SMS. As an alternative, a report can be made to the driver (visual or acoustic warning signal). The driver can then decide whether he wants an immediate transmission of the data. The recipients can, for example, be a defined service station or a service station to still be selected depending on the vehicle location and/or a call center, which stores the received data and transmits it to a corresponding service station upon request. This creates the possibility of a continuous quality control.

If the driver himself does not want to transmit data, he can, alternatively, submit the data to the service station by way of the vehicle key. This can take place, for example, in that he gives the vehicle key to a service advisor and the latter places the key in a reading device and reads out the data by means of the transponder.

Figure 2:
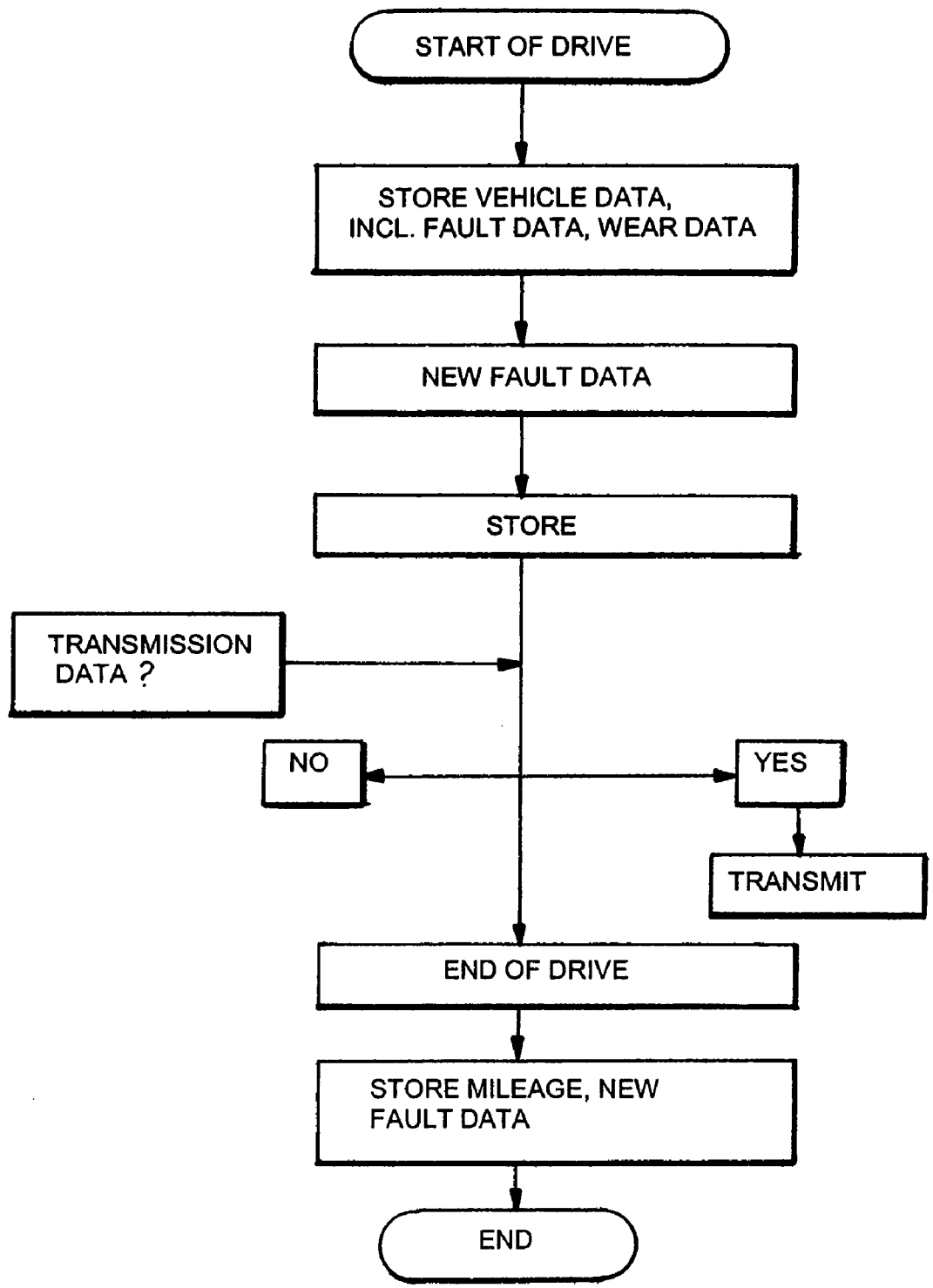
FIG. 2 is a flow chart illustrating the sequence of a second embodiment of the method according to the invention.

The exemplary embodiment of the method according to the invention illustrated in FIG. 2 differs essentially from the above-described method in that a data transmission is triggered by a command outside the vehicle. Additional process steps, such as the intermediate storage, were eliminated during the representation of FIG. 2 for the purpose of clarity.

As in the case of the previously described embodiment, faults occurring during the drive are stored in the central data memory, that is, the onboard computer, of the vehicle. The corresponding vehicle is equipped with a vehicle data remote query device; that is, exportable data are made available in the onboard memory. If a data transmission request takes place, for example from a service station or the manufacturer, having a query authorization, the available data are transmitted. If the request takes place by unauthorized third parties, no data is transmitted.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for wirelessly transmitting vehicle data, wherein vehicle data provided for data exportation is stored in a storage medium, and is read out and transmitted within a vehicle data acquisition framework, the method comprising the acts of:

at a beginning of a vehicle drive, storing in the storage medium or making available for a subsequent read-out the vehicle data intended for data exportation; and at a conclusion of the vehicle drive, performing at least one of changes and additions on the vehicle data stored in the storage medium or made available for the subsequent read-out at the beginning of the vehicle drive.

2. The method according to claim 1, wherein the method performs said at least one of the changes and additions on the vehicle data during the vehicle drive, and further wherein only an updating of the vehicle data occurs at the conclusion of the vehicle drive.

3. The method according to claim 1, wherein the storage medium is a transportable data storage medium or a vehicle key equipped with a memory.

4. The method according to claim 2, wherein the storage medium is a transportable data storage medium or a vehicle key equipped with a memory.

5. The method according to claim 1, wherein the vehicle data is wirelessly transmitted via a transponder or radio frequencies.

6. The method according to claim 5, wherein the radio frequencies are from a mobile telephone.

7. The method according to claim 1, wherein the vehicle data is wirelessly transmitted upon a driver's command.

8. The method according to claim 2, wherein the vehicle data is wirelessly transmitted upon a driver's command.

9. The method according to claim 5, wherein the vehicle data is wirelessly transmitted upon a driver's command.

10. The method according to claim 1, wherein the vehicle data is wirelessly transmitted upon receipt of an authorization command generated externally from the vehicle.

11. The method according to claim 2, wherein the vehicle data is wirelessly transmitted upon receipt of an authorization command generated externally from the vehicle.

12. The method according to claim 5, wherein the vehicle data is wirelessly transmitted upon receipt of an authorization command generated externally from the vehicle.

13. The method according to claim 1, further comprising the acts of:

transmitting the vehicle data to an external memory; and
reading-out the vehicle data from the external memory for subsequent transmission.

14. The method according to claim 2, further comprising the acts of:

transmitting the vehicle data to an external memory; and
reading-out the vehicle data from the external memory for subsequent transmission.

15. The method according to claim 13, further comprising the act of deleting the vehicle data in the external memory after a query of that vehicle data.

16. The method according to claim 14, further comprising the act of deleting the vehicle data in the external memory after a query of that vehicle data.

17. The method according to claim 1, further comprising the act of maintaining an onboard vehicle power supply active for a predetermined time duration after the conclusion of the vehicle drive.

18. The method according to claim 2, further comprising the act of maintaining an onboard vehicle power supply active for a predetermined time duration after the conclusion of the vehicle drive.

19. The method according to claim 1, further comprising the acts of:

evaluating in a central office the vehicle data transmitted from the vehicle; and
transmitting back to the vehicle a defect elimination program based upon the evaluated vehicle data.

20. The method according to claim 2, further comprising the acts of:

evaluating in a central office the vehicle data transmitted from the vehicle; and
transmitting back to the vehicle a defect elimination program based upon the evaluated vehicle data.

21. The method according to claim 19, wherein the act of transmitting back to the vehicle the defect elimination program is carried out by transmitting a data packet.

22. The method according to claim 20, wherein the act of transmitting back to the vehicle the defect elimination program is carried out by transmitting a data packet.

* * * * *